(12) United States Patent
McFarlane

(10) Patent No.: US 6,698,525 B2
(45) Date of Patent: Mar. 2, 2004

(54) LOW-TILL HARROW IMPLEMENT

(75) Inventor: Stanley E. McFarlane, Sauk City, WI (US)

(73) Assignee: McFarlane Manufacturing Co., Inc., Sauk City, WI (US)

( * ) Notice: Subject to any disclaimer, the term of this patent is extended or adjusted under 35 U.S.C. 154(b) by 34 days.

(21) Appl. No.: 10/010,100

(22) Filed: Nov. 8, 2001

(65) Prior Publication Data

US 2003/0085044 A1 May 8, 2003

(51) Int. Cl.$^7$ .......................... A01B 49/02; A01B 5/00; A01B 63/16
(52) U.S. Cl. ..................... 172/145; 172/174; 172/424
(58) Field of Search ................. 172/146, 424, 172/140, 178, 144, 145, 149, 155, 165, 166, 174, 175, 177, 184, 186

(56) References Cited

U.S. PATENT DOCUMENTS

| | | |
|---|---|---|
| 1,747,052 A | 2/1930 | Cody |
| 2,994,388 A | 8/1961 | Ryan |
| 3,090,447 A | 5/1963 | Hotchkiss, Jr. |
| 4,127,178 A | 11/1978 | Blair |
| 4,131,163 A | 12/1978 | Bezzerides |
| 4,180,005 A | 12/1979 | Zumbahlen |
| 4,212,254 A | 7/1980 | Zumbahlen |
| 4,245,706 A | 1/1981 | Dietrich, Sr. |
| 4,250,970 A * | 2/1981 | Pfenninger et al. ......... 172/142 |
| 4,313,503 A * | 2/1982 | Good et al. .................. 172/140 |
| 4,361,191 A | 11/1982 | Landoll et al. |
| 4,703,810 A | 11/1987 | Meiners |
| 5,052,495 A | 10/1991 | McFarlane et al. |
| 5,207,279 A | 5/1993 | Nelson et al. |
| 5,474,135 A | 12/1995 | Schlagel |
| 5,544,709 A * | 8/1996 | Lowe et al. ................. 172/661 |
| 5,622,227 A | 4/1997 | McDonald |
| 5,632,343 A | 5/1997 | Gengler |

FOREIGN PATENT DOCUMENTS

| | | | |
|---|---|---|---|
| FR | 821621 | * | 5/1937 |
| GB | 2137463 | * | 10/1984 |

OTHER PUBLICATIONS

"Super–Till Is The Ultimate...", Amco Products, Yazoo City, Mississippi.
"strawmaster®", Degelman Industries, Ltd, Saskatchewan, CA.
"Spiral Reel Stalk Chopper" McFarlane Mfg. Co. Inc., Sauk City, WI.
"Farm Equipment" Nov./Dec. 2001, Cover & p. 32.
"VersaTill™: Maximum Tillage Versatility" printout from Bigham Brothers, Inc. website http:bighambrothers.com/versatil.htm, Nov. 8, 2001, 4 pp.

* cited by examiner

Primary Examiner—Thomas B. Will
Assistant Examiner—Alicia Torres
(74) Attorney, Agent, or Firm—Lathrop & Clark LLP

(57) ABSTRACT

A low till agricultural implement has a frame with a hitch for attachment to a tractor. A straight coulter composed of an array of parallel circular blades is mounted to the front of the frame, and is followed by a spiral reel assembly and a spike tooth harrow assembly. The circular blades are mounted perpendicular to rotating shafts, and slice through field residue and soil with minimal side movement of material. The blades of the following reel then make cuts nearly perpendicular to those made by the circular blades. A trailing level bar follows the spiral reel. The implement aids in drying the soil surface layer, and, by cutting up residue and even spreading, the implement helps to warm up the soil.

2 Claims, 4 Drawing Sheets

LOW-TILL HARROW IMPLEMENT

CROSS REFERENCES TO RELATED APPLICATIONS

Not applicable.

STATEMENT AS TO RIGHTS TO INVENTIONS MADE UNDER FEDERALLY SPONSORED RESEARCH AND DEVELOPMENT

Not applicable.

BACKGROUND OF THE INVENTION

When preparing a seedbed, it is necessary to break apart crop residue and loosen the top soil. Many implements have been devised to work the soil and prepare it to best receive seeds. Rotating reels slice surface material; plows, shanks, and cupped or inclined disks horizontally till the soil, and spike tooth harrows loosen the soil. Yet, each time that a tractor pulls an implement across a field, there is the possibility of compacting the soil and thereby lessening the quality of the seedbed. Moreover, each crossing of the field by a tractor represents an additional investment of labor, fuel, and machine wear, which factors into the cost of the production of a commodity that is competitively priced. To minimize the steps to preparing the seedbed, low-till methods have been developed which involve chopping the plant residue while disturbing only the top layer of the soil. The low-till method allows plant residue to remain on the surface of the soil unburied. When crop residue remains on the surface, the soil better retains moisture and the residue reduces erosion caused by air and water. Moreover, exposed crop residue on the surface, because it is exposed to the air, decomposes, which returns nutrients to the soil.

The low-till method can require multiple tilling operations to be performed by different agricultural devices. To save time and energy, existing agricultural implements have consolidated these devices onto a single trailer that is pulled behind a tractor. For example, a single implement such as the Amco ST2 SUPER-TILL seedbed conditioner has two rows of live leaf or Danish shanks, followed by chopper reels, spike tooth harrows, and a choice of a drag board, double rolling baskets, or a drag pipe as a rear finishing attachment. However, the rows of shanks produce horizontal tillage of the soil, contributing to an undesirable compaction of the soil.

The McFarlane SPIRAL REEL stalk chopper, manufactured by the Mc Farlane Manufacturing Company, Inc., of Sauk City, Wis., has a spiral reel, followed by a flexible spike tooth harrow, with a trailing spreader board. This implement avoids horizontal tillage, and fields treated by such an apparatus tend to have well developed plant root structures.

Because improved seedbed conditions can result in improved yields, and hence greater profitability, there is a continuing need for a combination of field treatments that will result in optimal crop growing conditions. What is needed is a low-till agricultural implement that can prepare a superior seedbed by chopping up plant residue without burying it, while disturbing only the top layer of soil and minimizing horizontal tilling.

SUMMARY OF THE INVENTION

The implement of this invention has an array of circular blades mounted perpendicular to horizontal shafts, known as a straight coulter, followed by one or more reels, which are followed by spike toothed harrows. The implement does not have any horizontal tillage tools, such as cultivator shoes or inclined or cupped discs, which would work the soil horizontally. Horizontal tillage of necessity creates soil regions of greater or lesser compaction. When the plant's roots encounter a more compacted portion of soil, the root will often divert around it, detrimentally consuming plant resources. By slicing through the soil first in the direction of travel by the straight coulter, and then perpendicular to the direction of travel by the reels, the surface material such as stalks and weeds is reduced to small pieces, regardless of orientation, while there is minimal horizontal distribution of the soil. The implement aids in drying the soil surface layer, and, by cutting up residue and even spreading, the implement helps to warm up the soil.

It is an object of the present invention to provide a farm implement to be pulled behind a vehicle that performs a low-till operation on a field by chopping plant residue without burying the residue under the soil.

It is another object of the present invention to provide an agricultural implement that minimizes horizontal tillage by utilizing flat, circular blades that extend vertically from a shaft.

It is an additional object of the present invention to provide an agricultural implement that performs a low-till operation on the soil in one pass over the field.

Further objects, features and advantages of the invention will be apparent from the following detailed description when taken in conjunction with the accompanying drawings.

DESCRIPTION OF THE PREFERRED EMBODIMENTS

Figure 1:
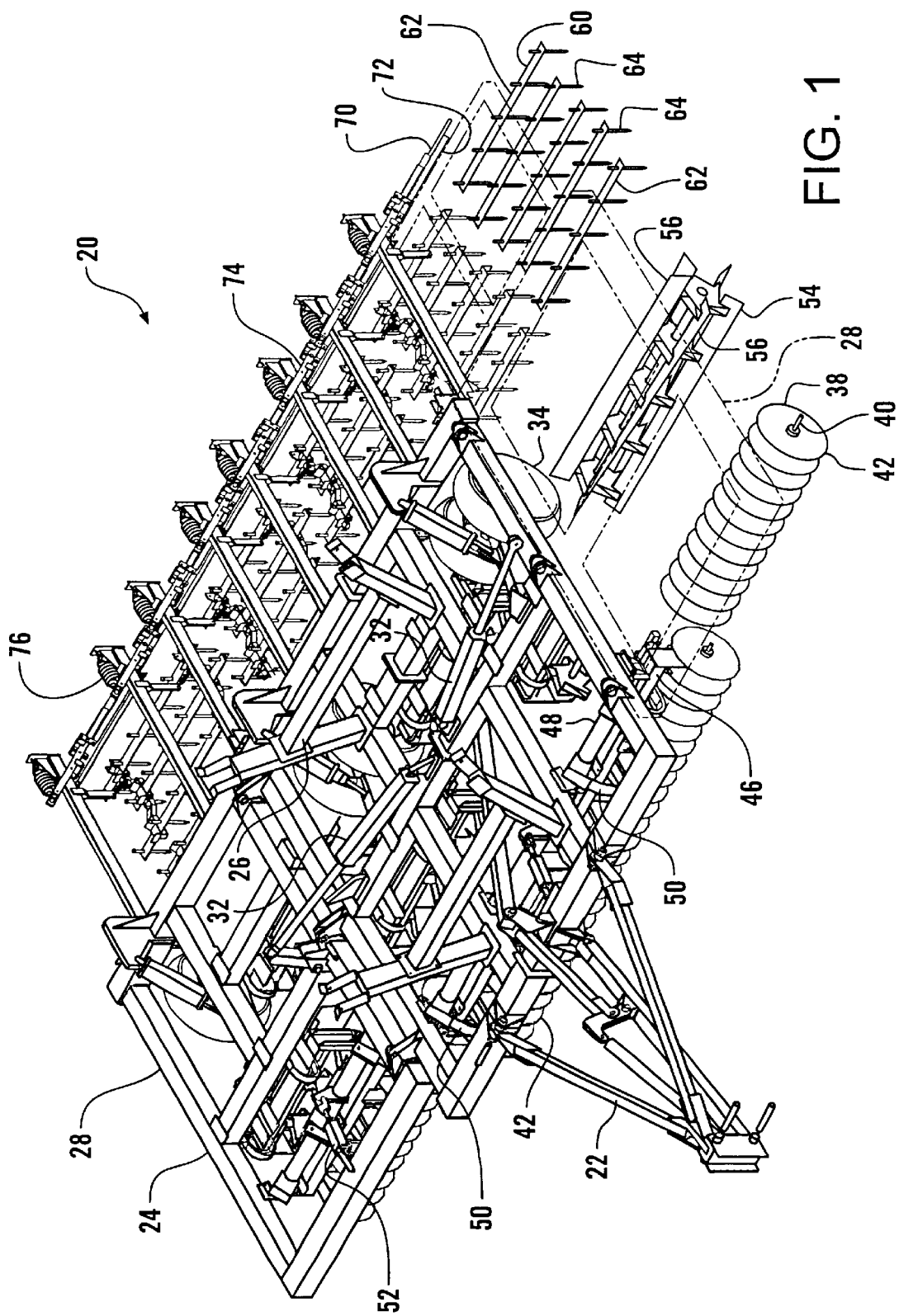
FIG. 1 is an isometric view of the agricultural implement of this invention, with portions of the frame broken away to show portions of the tilling assemblies mounted thereon.

Referring more particularly to FIGS. 1–4, wherein like numbers refer to similar parts, the agricultural implement 20 of this invention is shown in FIG. 1. The implement 20 is pulled by a tractor 21 and has a conventional self-leveling hitch 22 which is connected to the front end of a tubular steel frame 24. The frame 24 is preferably constructed to be collapsible for transporting the implement along public roads. Hence the frame may have a central segment 26 with two side wings 28 which are adjustable by hydraulic actuators 32 to reduce the overall dimensions of the implement 20 for compact transport. Wheels 34 with rubber tires are mounted beneath the frame 24, and are mounted on axles which are adjustable with hydraulic actuators to extend the wheels for road transport, and to retract the wheels as desired when the implement is in use on a field 36.

Figure 3:
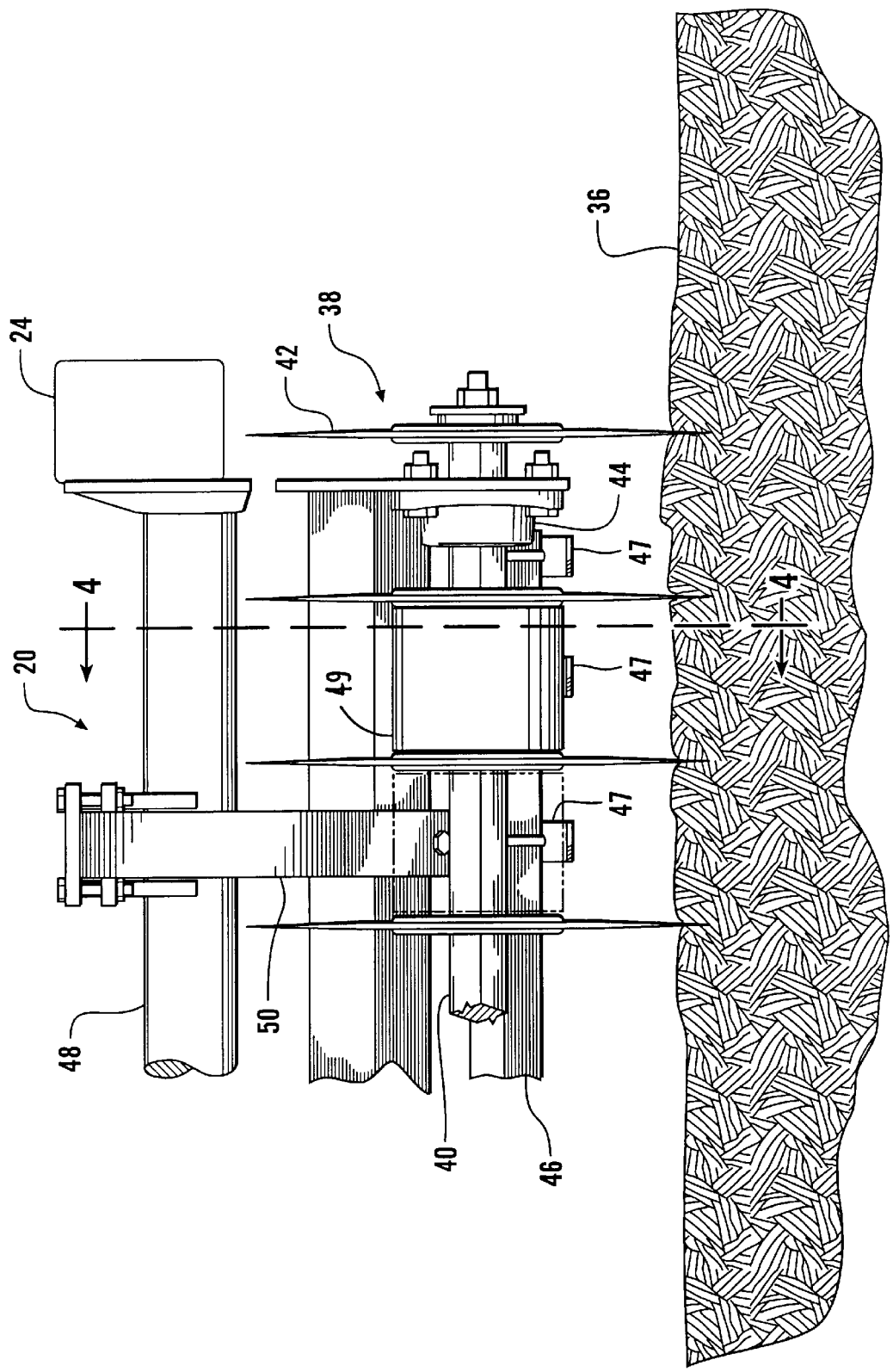
FIG. 3 is a fragmentary cross-sectional view of the implement of FIG. 1.
Figure 4:
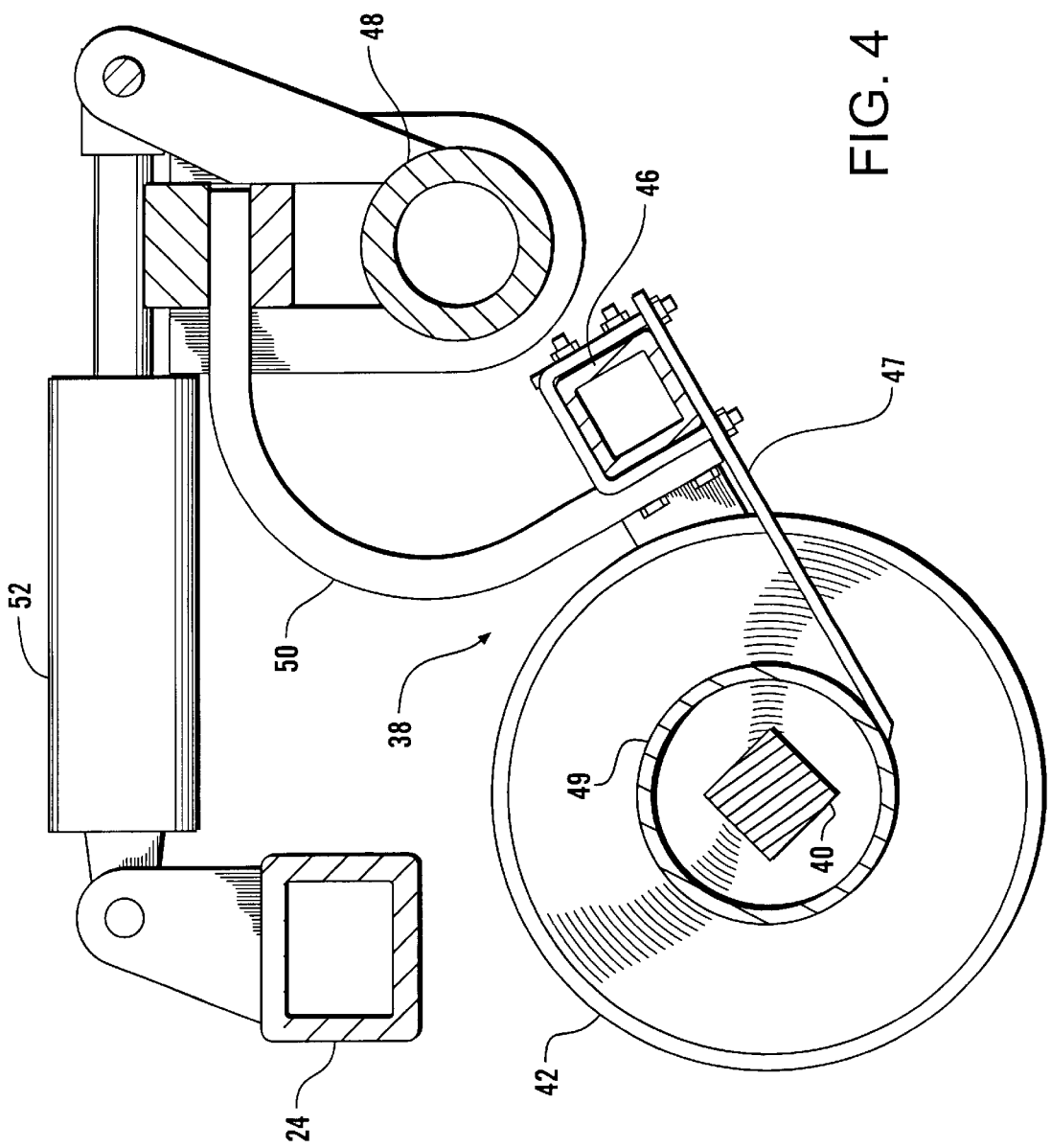
FIG. 4 is a fragmentary cross-sectional view of the implement of FIG. 3 taken along section line 4—4.

A circular blade assembly 38, sometimes referred to as a straight coulter, is mounted to the frame 24 immediately behind the hitch 22. The circular blade assembly 38 is formed of a number of horizontal shafts 40 to which generally flat circular blades 42 are mounted. The blades 42 have tapered radial edges and are fixed to the shafts 40, which rotate in bearings 44 mounted to a cross beam 46 which is supported from a pivoting cross member 48 on several steel springs 50. As shown in FIGS. 1 and 4, hydraulic actuators 52 extend between the frame and a pivoting cross member 48, to pivot the circular blade assembly 38 (for clarity, several of the actuators have been omitted from FIG. 1). As shown in FIGS. 3 and 4, Scrapers 47 are positioned between the circular blades 42, and are mounted to the crossbeam 46. The scrapers 47 prevent the build up of soil and debris between adjacent circular blades 42.

The shafts 40 are rotatably mounted to the frame 24 so as to extend generally perpendicular to the direction of travel of the implement 20 when pulled by the tractor. As shown in FIG. 3, the circular blades 42 are mounted perpendicular to the shafts 40, and thus, when drawn across the field 36 will extend vertically into the soil, slicing through the surface material, with minimal sideward displacement of soil. The straight coulter thus achieves a cutting action with minimal horizontal tillage. The lateral displacement of soil in horizontal tillage creates a variation in soil density throughout the field. This variation may hinder the growth of plant roots in the soil, which reduces the overall yield of the crop. The implement 20 achieves seedbed preparation with minimal horizontal tillage. The circular blades 42 may be about 20 inches in diameter, and will typically extend about three inches deep into the ground. The shafts 40 are preferably 1½ inches square, and the blades 42 are spaced on approximate six inch centers, with spacers 49 positioned between the blades. The spacers 49 may be cylindrical pipes with a vertical plate in the center having a square hole through which the shaft 40 extends.

A second tilling assembly is a spiral blade reel assembly 54 which is attached to the frame rearwardly of the circular blade assembly 38. The reel assembly 54 preferably has five spiral blades 56 mounted to a shaft that rotates as the blades engage the soil. The spiral blades 56 thus extend across the path of the implement, and are generally perpendicular to the cutting action of the circular blades 42. The reel assemblies 54 have brackets 58 which are spring mounted to the frame 24. The spiral blades 56 contact the field 36 to further chop plant residue and loosen the soil. The reel assemblies will generally cut about 2–3 inches into the ground. The relative depths to which the spiral blades 56 and the circular blades 42 extend into the ground may be adjusted by controlling the disposition of weight on to the circular blade assembly 38 and the spiral blade reel assembly 54 by pivoting the circular blade assembly through the actuators 52, and by the selected level of the wheels 34.

A harrow assembly 60 is mounted to the frame 24 after the spiral blade reel assemblies 54. The harrow assembly may be any conventional flexible harrow arrangement, for example a spike tooth harrow, having multiple rigid side-to-side harrow bar members 62 to which a plurality of spike teeth 64 are fixed. The harrow bar members 62 are connected together by pivoting links. In transit, when the implement 20 does not engage the field, the entire bar assembly is suspended from chains 66 from front, middle and back vertical projections 68 which extend downwardly from the frame 24. In use, the spike teeth 64 engage the ground, and the front chains 66 drag the harrow across the field 36. The harrow finishes off the field, scattering residue, breaking up clumps, and conditioning the soil.

Figure 2:
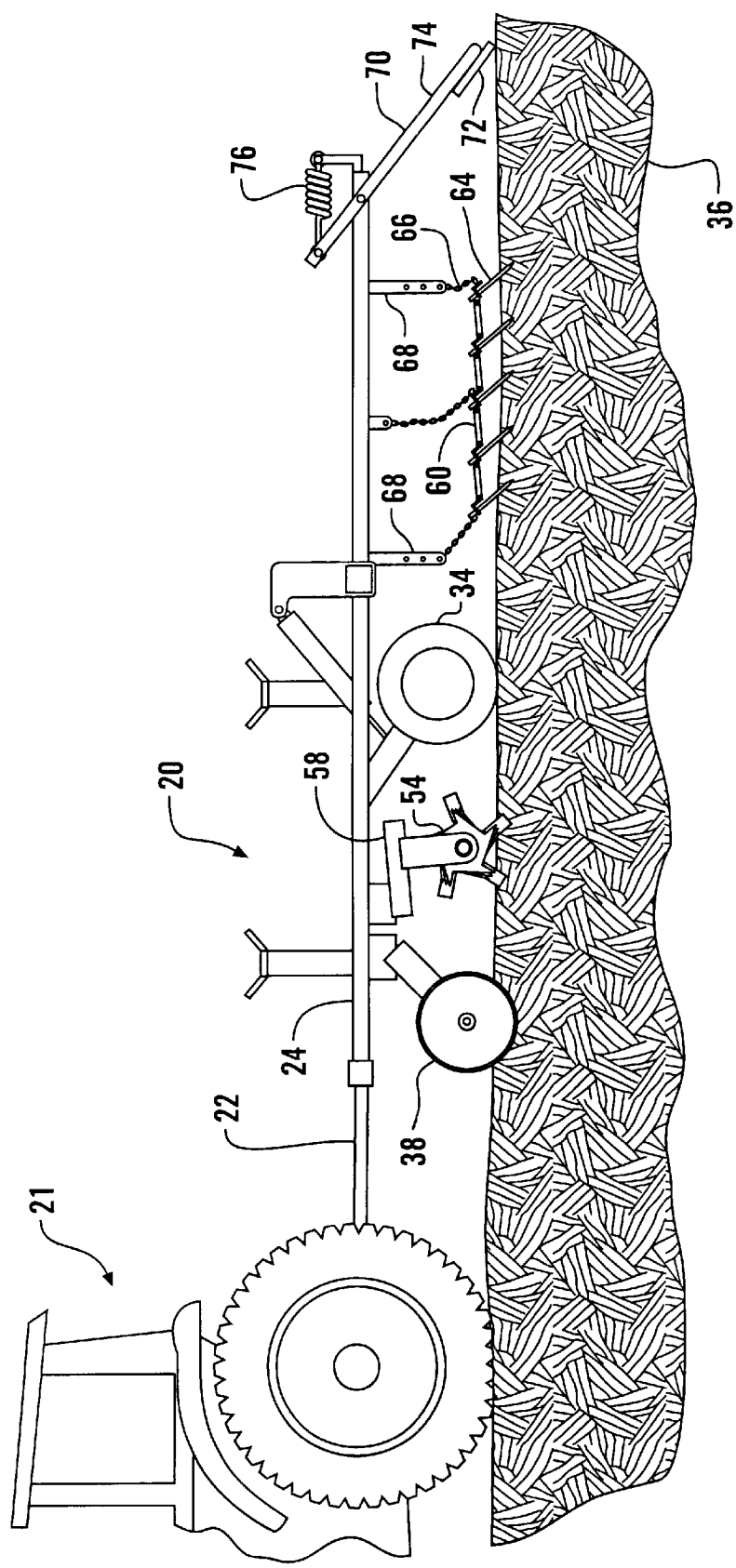
FIG. 2 is a side elevational view of the implement of FIG. 1 as it is pulled behind a tractor and as it engages the field, shown in section.

As shown in FIGS. 1 and 2, the implement 20 may be provided with a spreader board assembly 70 which comprises horizontal boards 72 mounted on rearwardly angled braces 74 which are biased downward by springs 76 which permit the boards to release upwardly when encountering an obstruction such as a stone. The boards 72 will be run in engagement with the field 36 where required, for example, when running in chisel plowed ground, where the boards will pull the dirt to finish off the field. Otherwise, the boards 72 can be adjusted to run about one inch off the ground to feather out clumps.

The total width of the implement 20 and the various tilling assemblies may be varied, for example to be from about 16 feet wide to about 30 feet wide. The implement 20 is optimally pulled over the field at approximately 9 to 11 miles per hour. The implement 20 has several advantages over some prior art approaches. The tilling assemblies are mounted to the frame without any horizontal tillage assemblies. No cupped disc blades, cultivator shanks, cultivator sweeps or other horizontal tillage apparatus are mounted to the frame. Because there is minimal or no horizontal tillage, variations in soil density layers are minimized. Moreover, horizontal tillage such as with a disc cultivator or cultivator shanks, tend to dig more deeply into the ground, and require slower movement over the field. The implement 20 offers the advantage of speed, which contributes to reduced costs.

As the implement 20 is pulled through a field, the straight coulter circular blades cut lengthwise through the field residue and into the soil, then, immediately following, the spiral reel cuts the same residue crosswise. The immediately following harrow disperses the cut residue and soil in a smooth even pattern. All the assemblies on the implement 20 thus work together in a lightly penetrating way to achieve a mixed final seedbed.

It should be noted that although a preferred embodiment is illustrated and described, an implement of this invention may be formed of varying dimensions and construction to suit particular requirements. Other conventional coulters, reels, and flexible harrows may be substituted for the ones illustrated and described, and different mounting and actuation hardware may be employed.

It is understood that the invention is not limited to the particular construction and arrangement of parts herein illustrated and described, but embraces all such modified forms thereof as come within the scope of the following claims.

I claim:
1. An agricultural implement, comprising:
   a frame having a hitch for attachment to a vehicle, the frame extending rearwardly from the hitch, and being capable of being pulled by the vehicle in a direction of travel;
   at least one circular blade assembly mounted to the frame rearwardly of the hitch, the circular blade assembly being comprised of a plurality of parallel circular blades mounted to a shaft which extends generally perpendicular to the direction of travel of the implement, a cross beam positioned rearwardly of the circular blades, wherein the shaft is rotatably mounted to the cross beam, a cross member positioned rearwardly of the cross beam, and pivotably mounted to the frame, and at least one spring extending between the cross member and the cross beam, thereby resiliently mounting the shaft and the circular blades to the frame;
   at least one reel assembly mounted to the frame rearwardly of the at least one circular blade assembly; and
   at least one harrow assembly mounted to the frame rearwardly of the at least one reel assembly.
2. An agricultural implement, comprising:
   a frame having a hitch for attachment to a vehicle, the frame extending rearwardly from the hitch, and being capable of being pulled by the vehicle in a direction of travel;

at least one straight coulter assembly mounted to the frame rearwardly of the hitch, the straight coulter assembly being comprised of a plurality of parallel circular blades mounted to a shaft which extends generally perpendicular to the direction of travel of the implement, a cross beam positioned rearwardly of the circular blades, wherein the shaft is rotatably mounted to the cross beam, a cross member positioned rearwardly of the cross beam, and pivotably mounted to the frame, and at least one spring extending between the cross member and the cross beam, thereby resiliently mounting the shaft and the circular blades to the frame;

at least one spiral reel assembly mounted to the frame rearwardly of the at least one straight coulter assembly; and at least one harrow assembly mounted to the frame rearwardly of the at least one reel assembly, wherein no horizontal tillage devices are mounted to the frame.

* * * * *